United States Patent [19]
Meszaros et al.

[11] Patent Number: 6,080,331
[45] Date of Patent: *Jun. 27, 2000

[54] GLYCOL BASED ANTIFREEZE CONCENTRATES INHIBITED WITH MONOCARBOXYLIC ACID SALTS TOGETHER WITH HYDROCARBON-TRIAZOLES AND/OR -THIAZOLES

[75] Inventors: Ladislaus Meszaros, Ludwigshafen; Hans Schrimpf, Mutterstadt; Klaus Pfitzner, Ludwigshafen, all of Germany

[73] Assignee: BASF Aktiengesellschaft, Ludwigshafen, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/879,782

[22] Filed: Jun. 20, 1997

[51] Int. Cl.$^7$ ...................................................... C09K 5/00
[52] U.S. Cl. ................................. 252/79; 252/76
[58] Field of Search .................... 252/76, 79, 75

[56] References Cited

U.S. PATENT DOCUMENTS

| | | | |
|---|---|---|---|
| 3,240,708 | 3/1966 | Dulat et al. | 252/76 |
| 4,234,440 | 11/1980 | Hirozawa et al. | 252/76 |
| 4,434,066 | 2/1984 | Lewis | 252/77 |
| 4,503,242 | 3/1985 | Plueddemann | 556/401 |
| 4,578,205 | 3/1986 | Yeakey et al. | 252/76 |
| 4,584,119 | 4/1986 | Duranleau et al. | 252/75 |
| 4,588,513 | 5/1986 | Triebel et al. | 252/75 |
| 4,592,853 | 6/1986 | Darden et al. | 252/75 |
| 4,647,392 | 3/1987 | Darden et al. | 252/75 |
| 4,759,864 | 7/1988 | Van Neste et al. | 252/75 |
| 4,851,145 | 7/1989 | Van Neste et al. | 252/75 |
| 4,946,616 | 8/1990 | Falla et al. | 252/75 |
| 5,080,818 | 1/1992 | Tachiiwa et al. | 252/75 |
| 5,085,791 | 2/1992 | Burns | 252/79 |
| 5,085,793 | 2/1992 | Burns et al. | 252/79 |
| 5,223,164 | 6/1993 | Kanamori | 252/77 |
| 5,269,956 | 12/1993 | Miller et al. | 252/67 |
| 5,366,651 | 11/1994 | Maes et al. | 252/76 |
| 5,387,360 | 2/1995 | Uekusa et al. | 252/73 |
| 5,556,451 | 9/1996 | Minevski | 106/14.13 |

FOREIGN PATENT DOCUMENTS

| | | |
|---|---|---|
| 229 440 | 7/1987 | European Pat. Off. . |
| 479 470 | 4/1992 | European Pat. Off. . |
| 479 471 | 4/1992 | European Pat. Off. . |
| 487 194 | 5/1992 | European Pat. Off. . |
| 0564721 | 10/1993 | European Pat. Off. . |
| 564 721 | 10/1993 | European Pat. Off. . |
| 97/20901 | 6/1997 | WIPO . |

*Primary Examiner*—Christine Skane
*Attorney, Agent, or Firm*—Keil & Weinkauf

[57] ABSTRACT

The present invention relates to novel silicate-, borate- and nitrate-free antifreeze concentrates based on alkylene glycols or derivatives thereof which include an inhibitor combination essentially comprising salts of carboxylic acids together with hydrocarbon-triazoles and/or -thiazoles. These antifreeze concentrates are, in particular, entirely free from any salts of inorganic acids as corrosion inhibitors. The invention also relates to ready-to-use aqueous coolant compositions comprising these antifreeze concentrates.

8 Claims, No Drawings

GLYCOL BASED ANTIFREEZE CONCENTRATES INHIBITED WITH MONOCARBOXYLIC ACID SALTS TOGETHER WITH HYDROCARBON-TRIAZOLES AND/OR -THIAZOLES

The present invention relates to novel silicate-, borate- and nitrate-free antifreeze concentrates based on alkylene glycols or derivatives thereof which include an inhibitor combination essentially comprising salts of carboxylic acids together with hydrocarbon-triazoles and/or -thiazoles. The invention also relates to ready-to-use aqueous coolant compositions comprising these antifreeze concentrates.

Antifreeze compositions for the cooling circuits of internal combustion engines, for example in automobiles, generally include alkylene glycols, especially ethylene glycol or propylene glycol, as principal component. For use in the cooling system they are diluted with water and are intended to provide not only protection against frost but also for good heat dissipation. However, alkylene glycol/water mixtures are highly corrosive at the operating temperatures of internal combustion engines and as a consequence it is necessary adequately to protect the various metals and their alloys that are present in the cooling system against a wide variety of types of corrosion, for example pitting, crevice corrosion, erosion or cavitation. A large number of individual chemicals are already known from the prior art for use as corrosion inhibitors in such cooling systems.

As far as temperature stress on the heat transfer areas, pressure, flow rate and the selection of materials are concerned, the operating conditions in modern internal combustion engines nowadays place much greater demands on the corrosion prevention capacity of the coolant than was hitherto the case. In addition to the known materials such as copper, brass, soft solder, steel and gray cast iron, alloys of aluminum are also being used to an increasing extent. Recent patent literature, as a result, includes more descriptions of specific combinations of long-known active substances, each claimed to have a specific spectrum of action.

For instance, EP-B 229 440 (1) describes the combination of the salt of an aliphatic monobasic $C_3$–$C_{16}$ acid, the salt of a dibasic $C_5$–$C_{16}$ hydrocarbon acid and a hydrocarbon-triazole as an effective inhibitor formulation in a liquid alcoholic freezing-point reducer for protecting aluminum alloys against pitting. The concomitant use of further customary inhibitors, such as alkali metal borate, silicate, benzoate, nitrate, nitrite and molybdate, and/or of a hydrocarbazole is additionally recommended.

EP-A 308 037 (2) discloses antifreeze compositions, especially for car radiator protection, which comprise a combination of a water-soluble liquid alcoholic freezing-point reducer, the salt of a $C_6$–$C_{12}$ aliphatic monobasic acid, an alkali metal borate and a hydrocarbon-triazole, this composition protecting metals in particular against pitting, as is derived from the results of electrochemical measurements. In this document too, it is possible to employ further customary inhibitors such as alkali metal benzoates, silicates, nitrates and molybdates.

GB-B 1 004 259 (3) discloses the combination of a hydrocarbon-triazole, such as benzotriazole, with a dicarboxylic acid such as sebacic acid, for example in the form of an amine salt, as corrosion inhibitors. The use of further inorganic inhibitors, such as borax, at the same time is also recommended.

EP-A 035 834 (4) discloses a corrosion inhibitor mixture comprising a triazole, an alkali metal borate, an alkali metal benzoate, an alkali metal silicate and an alkali metal salt of a $C_7$–$C_{13}$ dicarboxylic acid.

U.S. Pat. No. 4 587 028 (5) discloses a silicate-free antifreeze composition comprising as corrosion inhibitors an alkali metal benzoate, an alkali metal nitrate and an alkali metal salt of a $C_8$–$C_{12}$ dicarboxylic acid.

EP-B 251 480 (6) describes an antifreeze concentrate whose corrosion inhibitors are an alkylbenzoic acid or a salt thereof, a monobasic aliphatic $C_8$–$C_{12}$ acid or a salt thereof and a hydrocarbon-triazole. It is also recommended to use, concomitantly, further inhibitors such as the borates, silicates, nitrates, nitrites or molybdates of alkali metals.

EP-A 369 100 (7) describes a mixture of decanedioic acid, dodecanedioic acid and tolutriazole as corrosion inhibitor for use in a coolant composition comprising ethylene glycol and diethylene glycol in a ratio of 90:10 as alcoholic freezing-point reducer.

It is known that borates can have a dramatically adverse effect on corrosion protection for aluminum under hot-surface stress. If silicates are present, this adverse effect does not arise. Under optimum conditions, therefore, borate and silicate are in a balanced ratio. If the ratio of silicate to borate is too low, the corrosion-inhibiting action of the entire mixture is impaired. A deficit of silicate originally present in a coolant formulation in sufficient quantity can also come about in the course of service as a result of the precipitation of insoluble silicate modifications, for example as a result of inadequate silicate stabilization, leading to a reduction in the proportion of soluble silicate.

It is therefore an object of the present invention to provide inhibitor systems for coolant compositions which are effective without sensitive, inorganic inhibitor substances of this kind, ie. without salts of inorganic acids, especially without alkali metal borates and alkali metal silicates, and which provide adequate protection against corrosion for all of the metals employed in constructing engines, but especially for aluminum under high hot-surface stresses.

We have found that this object is achieved by silicate-, borate- and nitrate-free antifreeze concentrates which are based on alkylene glycols or derivatives thereof and comprise (a) from 0.05 to 10% by weight, preferably from 0.1 to 5% by weight, based on the total amount of concentrate, of at least one carboxylic acid having 3 to 16 carbon atoms in the form of its alkali metal salts, ammonium salts or substituted ammonium salts, and (b) from 0.01 to 3% by weight, preferably from 0.05 to 1% by weight, based on the total amount of concentrate, of at least one hydrocarbon-triazole and/or hydrocarbon-thiazole, especially benzotriazole and/or tolutriazole.

In a preferred embodiment the novel antifreeze concentrates are completely free from any salts of inorganic acids which are effective corrosion inhibitors. In particular they contain no alkali metal phosphates, no alkali metal molybdates and no alkali metal nitrites.

In a further preferred embodiment, component (a) is a mixture of at least two carboxylic acids. If this mixture comprises, for example, two carboxylic acids, their weight ratio is usually from 1:99 to 99:1, in particular from 3:97 to 97:3.

(a) is particularly preferably a mixture of two dicarboxylic acids, especially two aliphatic dicarboxylic acids.

(a) is also particularly preferably a mixture of two monocarboxylic acids, especially one aliphatic monocarboxylic acid and one aromatic monocarboxylic acid.

(a) is also particularly preferably a mixture of a monocarboxylic acid and a dicarboxylic acid, especially a branched-chain aliphatic monocarboxylic acid and an aliphatic dicarboxylic acid.

Particularly suitable dicarboxylic acids are those of 4–16 carbon atoms, especially 8–12 carbon atoms, examples being suberic, azeleic, sebacic, undecanedioic, dodecanedioic, dicyclopentadienedicarboxylic, phthalic and terephthalic acid.

Particularly suitable linear and branched-chain aliphatic monocarboxylic acids are those of 5–12 carbon atoms, examples being pentanoic, hexanoic, octanoic, nonanoic, decanoic, undecanoic, dodecanoic, 2-ethylhexanoic and isononanoic acid.

Particularly suitable aromatic monocarboxylic acids are those of 7–16 carbon atoms, especially benzoic acid, alkylbenzoic acids with 1–8 carbon atoms in the side chain, eg. o-, m- or p-methylbenzoic acid, and hydroxy aromatic monocarboxylic acids, eg. o-, m- or p-hydroxybenzoic acid and o-, m- or p-(hydroxymethyl)benzoic acid.

These carboxylic acids are present in the form of their alkali metal salts, especially sodium or potassium salts, or as ammonium salts or substituted ammonium salts (amine salts), for example salts with trialkylamines or trialkanolamines.

The carboxylic acids which can be employed in accordance with the present invention generally contain no functional groups other than the carboxyl groups and, possibly, hydroxyl groups. These carboxylic acids can at most include ether oxygens and/or carbonyl functions. However, they must not include halogens or nitrogen functional groups such as nitro or amino.

The novel silicate-, borate- and nitrate-free antifreeze concentrates can comprise additional corrosion inhibitors in an amount of up to 2% by weight, in particular from 0.001 to 1% by weight, of the overall amount of the concentrate, these inhibitors comprising at least one guaternized imidazole. Such quaternized imidazoles are described in German Patent Application 196 05 509. Examples hereof are 1-methylimidazole, 1-ethylimidazole, 1-(β-hydroxyethyl)imidazole, 1,2-dimethyl-imidazole, 1-phenylimidazole, benzimidazole and, in particular, N-vinylimidazole, quaternized with benzyl chloride, benzyl bromide, methyl chloride, methyl bromide, ethyl chloride, ethyl bromide, diethyl sulfate or, in particular, dimethyl sulfate.

The novel silicate-, borate- and nitrate-free antifreeze concentrates can comprise further additional corrosion inhibitors in an amount of up to 2% by weight, in particular from 0.001 to 1% by weight, of the overall amount of the concentrate, these inhibitors comprising at least one soluble magnesium salt of an organic acid, especially a carboxylic acid. Examples of such magnesium salts are magnesium benzenesulfonate, methanesulfonate, acetate and propionate.

In addition to the abovementioned inhibitor components it is also possible, for example, to employ hydrocarbazoles in customary amounts.

The overall corrosion inhibitor component can constitute up to 15% by weight, in particular up to 10% by weight, of the overall amount of the concentrate, the concentration of individual components being up to 10% by weight, in particular up to 5% by weight.

Moreover, the novel silicate-, borate- and nitrate-free antifreeze concentrates can additionally comprise up to 1% by weight, in particular 0.01–0.5% by weight, based on the overall amount of the concentrate, of hard water stabilizers based on polyacrylic acid, polymaleic acid, acrylic acid-maleic acid copolymers, polyvinylpyrrolidone, polyvinylimidazole, vinylpyrrolidone-vinylimidazole copolymers and/or copolymers of unsaturated carboxylic acids and olefins.

The pH of the novel silicate-, borate- and nitrate-free antifreeze concentrates is customarily 7–10, preferably 7.5–9.5, in particular 8.0–9.0. The desired pH is generally established by adding alkali metal hydroxide, ammonia or amines to the formulation, with solid sodium hydroxide and potassium hydroxide and aqueous sodium hydroxide and potassium hydroxide solutions being particularly suitable for this purpose.

The aliphatic or aromatic mono- and/or dicarboxylic acids are advantageously added already in the form of the corresponding alkali metal salts so as to establish the desired pH range automatically; however, it is also possible to add the free carboxylic acids and then neutralize them with alkali metal hydroxide, ammonia or amines and establish the desired pH range.

The liquid alcoholic freezing-point reducer which normally makes up the major proportion (generally at least 80% by weight, in particular at least 90% by weight) of the novel antifreeze concentrates is suitably alkylene glycols or derivatives thereof, especially propylene glycol and, in particular, ethylene glycol. However, higher glycols and glycol ethers are also suitable, examples being diethylene glycol, dipropylene glycol and monoethers of glycols, such as the methyl, ethyl, propyl and butyl ether of ethylene glycol, propylene glycol, diethylene glycol and dipropylene glycol. It is also possible to use mixtures of these glycols and glycol ethers. Preference is given to ethylene glycol on its own or to mixtures of alkylene glycols, ie. ethylene glycol, propylene glycol, higher glycols and/or glycol ethers, which comprise at least 95% by weight of ethylene glycol.

The present invention also relates to ready-to-use aqueous coolant compositions of reduced freezing point, in particular for radiator protection in the automotive sector, which comprise water and 10–90% by weight, preferably 20–60% by weight, of the novel silicate-, borate- and nitrate-free antifreeze concentrates.

EXAMPLES

This invention is illustrated with reference to inventive Examples A, B and D and to Comparison Example C. Table 1 shows the composition of the illustrative inhibitor mixtures in ethylene glycol. These antifreeze concentrates were diluted with water and subjected to conventional corrosion tests. C is a commercially available prior art antifreeze with—in addition to benzoate and tolutriazole—a significant content of inorganic inhibitor components.

The corrosion protection capacity of the antifreeze concentrates of the composition from Examples A to D was assessed comparatively using the ASTM D 4340 corrosion test and the MTU (German Engine and Turbine Union) hot corrosion test.

TABLE 1

Compositions of the antifreeze concentrates [% by wt.]

| Components | Example C | Example A | Example B | Example D |
|---|---|---|---|---|
| tolutriazole | 0.105 | 0.20 | 0.20 | 0.20 |
| Sodium benzoate | 3.390 | — | 0.15 | — |
| Borax | 1.094 | — | — | — |
| Sodium nitrate | 0.380 | — | — | — |
| Sodium nitrite | 0.540 | — | — | — |
| Waterglass (36% by wt.) | 0.123 | — | — | — |
| Water | 1.210 | — | — | — |
| Customary hard water stabilizer | 0.413 | — | — | — |

TABLE 1-continued

Compositions of the antifreeze concentrates [% by wt.]

| Components | Example C | Example A | Example B | Example D |
|---|---|---|---|---|
| (20% by wt. in water) | | | | |
| Sodium adipate | — | 0.65 | — | — |
| Sodium sebacate | — | 3.65 | — | 1.70 |
| 2-Ethyl-hexanoic acid Na salt | — | — | 4.11 | — |
| Isononanoic acid Na salt | — | — | — | 3.42 |
| Monoethylene glycol | Remainder to 100 | Remainder to 100 | Remainder to 100 | Remainder to 100 |

The extremely good protection afforded to aluminum is evident from the test results shown in Table 2. The increases in weight found with the novel compositions A and B in the ASTM D 4340 test point to the formation of a stable protective coat, whereas formulation C in particular shows considerable losses in weight under the test conditions: in other words, removal of material. Under the very stringent conditions of the MTU hot corrosion test, formulation C exhibits considerable deficiencies, while novel products A, B and D show a markedly better protective action, ie. less removal of material.

TABLE 2

Test results

| Corrosion test | Example C | Example A | Example B | Example D |
|---|---|---|---|---|
| static hot-surface test on cast aluminum acc. to ASTM D 4340 | Change in weight [mg per cm$^2$ per week] | | | |
|  | −6.53 | +0.07 | +0.14 | −0.71 |
| dynamic hot-surface test on cast aluminum acc. to MTU hot corrosion test | Change in weight [mg per sample of same weight] | | | |
|  | −214.8 | −16.5 | −23.5 | −52.8 |

We claim:

1. A silicate-, borate- and nitrate-free antifreeze concentrate which is based on alkylene glycols or derivatives thereof and consists essentially of:

(a) from 0.05 to 10% by weight, based on the total amount of concentrate, of a mixture of two monocarboxylic acids each of 3 to 16 carbon atoms in the form of their alkali metal salts, ammonium salts or substituted ammonium salts, the first acid being an aliphatic monocarboxylic acid, and the second acid being a hydroxy aromatic monocarboxylic acid, selected from the group consisting of o-, m- or p-hydroxybenzoic acid and o-, m- or p-(hydroxymethyl)benzoic acid, and (b) from 0.01 to 3% by weight, based on the total amount of concentrate, of at least one hydrocarbon-triazole and/or hydrocarbon-thiazole.

2. A concentrate as claimed in claim 1, which in addition is free from further salts of inorganic acids.

3. A concentrate as claimed in claim 1, which additionally consists essentially of up to 2% by weight, based on the total amount of concentrate, of at least one quaternized imidazole.

4. A concentrate as claimed in claim 1, which additionally consists essentially of up to 2% by weight, based on the total amount of concentrate, of at least one soluble magnesium salt of an organic acid.

5. A concentrate as claimed in claim 1, which additionally consists essentially of up to 1% by weight, based on the total amount of concentrate, of hard water stabilizers based on a member selected from the group consisting of polyacrylic acid, polymaleic acid, acrylic acid-maleic acid copolymers, polyvinylpyrrolidone, polyvinylimidazole, vinylpyrrolidone-vinylimidazole copolymers and copolymers of unsaturated carboxylic acids and olefins.

6. A concentrate as claimed in claim 1 with a pH of 7–10.

7. A concentrate as claimed in claim 1 which is based on ethylene glycol or mixtures of alkylene glycols comprising at least 95% by weight ethylene glycol.

8. A ready-to-use aqueous coolant composition of reduced freezing point which comprises water and 10–90% by weight of a concentrate as claimed in claim 1.

* * * * *